US011780316B2

(12) United States Patent
Daikeler et al.

(10) Patent No.: US 11,780,316 B2
(45) Date of Patent: Oct. 10, 2023

(54) HYBRID MODULE HAVING MANAGEMENT OF WEAR DEBRIS FOR A DRY FRICTION CLUTCH (71) Applicant: Schaeffler Technologies AG & Co. KG, Herzogenaurach (DE)

(72) Inventors: René Daikeler, Sasbach (DE); Christian Basler, Offenburg (DE); Christoph Raber, Ottweiler-Steinbach (DE); Florian Vogel, Bühl (DE); Matthias Dannhäuser, Eisingen (DE); Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/628,240

(22) PCT Filed: Jul. 3, 2020

(86) PCT No.: PCT/DE2020/100587
§ 371 (c)(1),
(2) Date: Jan. 19, 2022

(87) PCT Pub. No.: WO2021/023333
PCT Pub. Date: Feb. 11, 2021

(65) Prior Publication Data
US 2022/0266674 A1 Aug. 25, 2022

(30) Foreign Application Priority Data

Aug. 2, 2019 (DE) .................. 10 2019 120 905.6
Sep. 25, 2019 (DE) .................. 10 2019 125 780.8

(51) Int. Cl.
*B60K 6/387* (2007.10)
*F16D 13/52* (2006.01)
(Continued)

(52) U.S. Cl.
CPC ............. *B60K 6/387* (2013.01); *F16D 13/52* (2013.01); *F16D 25/10* (2013.01); *B60K 2006/4825* (2013.01); *F16D 2500/1066* (2013.01)

(58) Field of Classification Search
CPC . B60K 6/387; B60K 2006/4825; F16D 13/52; F16D 25/123
See application file for complete search history.

(56) References Cited

U.S. PATENT DOCUMENTS

| 5,904,234 A | * | 5/1999 | Kosumi | ................. F16D 13/52 |
| | | | | 192/109 A |
| 2007/0175726 A1 | | 8/2007 | Combes et al. | |

(Continued)

FOREIGN PATENT DOCUMENTS

| CN | 103975171 A | * | 8/2014 | ............ F16D 13/52 |
| DE | 19618865 A1 | | 11/1997 | |

(Continued)

OTHER PUBLICATIONS

Machine translation of DE102017130348, retrieved from espacenet.com (Year: 2023).*

*Primary Examiner* — Stacey A Fluhart (57) ABSTRACT

A hybrid module for a drive train of a motor vehicle includes an electrical machine, a dry friction clutch for coupling the electrical machine with the drive train, an input shaft arranged to be coupled to an internal combustion engine of the motor vehicle, and an output shaft arranged to be coupled to a vehicle transmission of the motor vehicle. The dry friction clutch is designed to lead away or secure wear debris of the dry friction clutch. The hybrid module may be arranged as a P2 hybrid module within the drive train between an internal combustion engine side of the motor vehicle and a vehicle transmission side of the motor vehicle. The dry friction clutch may be a dry multi-disk clutch.

14 Claims, 4 Drawing Sheets

(51) Int. Cl.
*F16D 25/10* (2006.01)
*B60K 6/48* (2007.10)

(56) References Cited

U.S. PATENT DOCUMENTS

2016/0059695 A1* 3/2016 Huber ................... F16D 63/002
                                                              74/11
2020/0116208 A1* 4/2020 Riedisser ................ F16D 13/72

FOREIGN PATENT DOCUMENTS

| | | | |
|---|---|---|---|
| DE | 10018926 A1 | 11/2000 | |
| DE | 102007060165 A1 | 6/2009 | |
| DE | 102013210366 A1 | 1/2014 | |
| DE | 102014204841 A1 * | 9/2015 | ............. F16D 13/52 |
| DE | 102015224753 B3 * | 1/2017 | |
| DE | 102017101379 A1 * | 7/2018 | |
| DE | 102017130348 A1 * | 6/2019 | |
| DE | 102018221525 A1 | 6/2019 | |
| DE | 102018103981 A1 | 8/2019 | |
| DE | 102018103984 A1 | 8/2019 | |
| DE | 102018119192 A1 | 2/2020 | |
| DE | 102019112571 A1 | 11/2020 | |
| DE | 102019123097 A1 | 2/2021 | |
| EP | 0773127 A2 | 5/1997 | |

* cited by examiner

HYBRID MODULE HAVING MANAGEMENT OF WEAR DEBRIS FOR A DRY FRICTION CLUTCH

CROSS-REFERENCE TO RELATED APPLICATIONS

This application is the United States National Phase of PCT Appln. No. PCT/DE2020/100587 filed Jul. 3, 2020, which claims priority to German Application Nos. DE102019120905.6 filed Aug. 2, 2019 and DE102019125780.8 filed Sep. 25, 2019, the entire disclosures of which are incorporated by reference herein.

TECHNICAL FIELD

The present disclosure relates to a dry multi-disk clutch, in particular for a hybrid drive train, and to a hybrid drive train having a dry multi-disk clutch for coupling and uncoupling an internal combustion engine, and/or having a dry multi-disk clutch integrated into the rotor of an electrical machine, such as an electric motor or a generator.

BACKGROUND

For the growing market for hybrid drive trains, in particular in a P2 arrangement, there is an increasing need for disconnect clutches. In many cases, dry-running disconnect clutches are available here, which are particularly distinguished by small drag torques and the associated low power losses in the system. These thy-running disconnect clutches are usually dry multi-disk clutches, i.e., generally multi-disk clutches in which the disks are mounted so that they can move freely in the axial direction. When opening and closing the clutch, they are moved axially within a corresponding external toothing or internal toothing.

A drive train of a hybrid vehicle includes a combination of an internal combustion engine and an electric motor and enables—for example in urban areas—a purely electric mode of operation with sufficient range and availability, in particular when driving overland. In addition, there is the possibility of driving the internal combustion engine and the electric motor at the same time in certain operating situations. The electric motor of hybrid vehicles mostly replaces the previously common starter for the internal combustion engine and the alternator to reduce the weight increase of the hybrid vehicle compared to vehicles with conventional drive trains.

As is known from EP 0 773 127 A1, DE 100 18 926 A1 and US 2007/0175726 A1, a first clutch arrangement can be arranged between the internal combustion engine and the electric motor to separate the internal combustion engine from the electric motor and the rest of the drive train of the hybrid vehicle. In the case of a purely electric drive, the first clutch arrangement is then opened and the internal combustion engine switched off, so that the output torque of the hybrid vehicle is generated solely by the electric motor.

There is a continuing need to provide hybrid modules with optimized, compact installation spaces. For the growing market for hybrid drive trains, in particular in a P2 arrangement, there is still an increasing need for dry-running disconnect clutches, which are particularly characterized by low drag torques and the associated low power losses in the system.

In clutch arrangements, and in particular in dry-type disconnect clutches, there is a need to prevent wear debris, consisting, for example, of lining material from lining disks and any metallic components contained therein, as well as casting and/or steel particles of the thermal masses involved, from entering a sensitive region, for example in the region of an electric motor, or in other functional regions of an exemplary hybrid drive train.

SUMMARY

The present disclosure thus relates to a hybrid module, in particular for a drive train of a motor vehicle, which hybrid module can be arranged as a P2 hybrid module within the drive train between an internal combustion engine side of the motor vehicle directed toward an internal combustion engine and a vehicle transmission side of the motor vehicle directed toward a vehicle transmission. The hybrid module has at least one electrical machine and at least one dry friction clutch having an axis of rotation, the friction clutch being a dry multi-disk clutch, for example. The hybrid module also has an input shaft, which can be coupled to the internal combustion engine of the motor vehicle, and an output shaft, which can be coupled to the vehicle transmission of the motor vehicle. The at least one electrical machine and the at least one friction clutch cooperate in such a way that the electrical machine can be coupled into and/or uncoupled from the drive train of the motor vehicle by means of the friction clutch, and the at least one friction clutch is designed to lead away and/or secure wear debris of the at least one friction clutch.

The present disclosure thus provides that, when the friction clutch is in operation, wear debris produced by friction between friction means, in particular between disks, is led away from the friction clutch or secured. Since it is a dry friction clutch, centrifugal forces and/or weight forces or gravity can be used to lead away the wear debris, for example.

The fact that the at least one friction clutch is designed to lead away wear debris of the at least one friction clutch means, in other words, that the friction clutch has a wear debris management device. The friction clutch can be a multi-disk clutch, for example, in particular for a hybrid drive train.

Depending on the point of intervention, a hybrid module can be divided into the following categories P0-P4, with P0: via a belt to the internal combustion engine, P1: directly behind the internal combustion engine, P2: behind the clutch arrangement but in front of the vehicle transmission, P3: into the vehicle transmission, and P4 on vehicle wheel, possibly on a different axle, or as a wheel hub motor. A P2 hybrid module is arranged within the drive train of a motor vehicle between the internal combustion engine and the vehicle transmission. In purely electric driving, for example, the internal combustion engine is disengaged by a corresponding clutch arrangement. The hybrid module according to the present disclosure is designed as a P2 hybrid module.

In the context of this application, the drive train of a motor vehicle is understood to mean all components that generate the power for driving the motor vehicle in the motor vehicle and transmit it to the road via the vehicle wheels.

For the purposes of this application, motor vehicles are land vehicles that are moved by machine power without being bound to railroad tracks. A motor vehicle can be selected, for example, from the group of passenger cars, trucks, small motorcycles, light motor vehicles, motorcycles, motor buses coaches or tractors.

A hybrid electric vehicle (HEV) is an electric vehicle that is driven by at least one electric motor and another energy converter and draws energy from the electrical storage unit (battery) thereof as well as an additional fuel.

An internal combustion engine converts chemical energy into mechanical work. For this purpose, an ignitable mixture of fuel and air is burned in the combustion chamber of the internal combustion engine. The characteristic of the internal combustion engine is the "internal combustion", i.e., the generation of the combustion heat in the internal combustion engine. The thermal expansion of the resulting hot gas is used to move pistons (rotors in Wankel engines).

The vehicle transmission is the transmission in the drive train of a motor vehicle that converts the engine speed to the drive speed.

An electrical machine is, for example, an electric motor that converts electrical power into mechanical power. As a rule, current-carrying conductor coils in electric motors generate magnetic fields, the mutual forces of attraction and repulsion of which are converted into motion. The electrical machine can also be a generator and convert mechanical power into electrical power.

To actuate the clutch arrangement designed as a friction clutch, in particular to close the friction clutch, a hydraulic fluid, in particular oil, can be pumped into a pressure chamber, whereby the pressure in the pressure chamber increases. The increasing pressure in the pressure chamber can overcome the spring force of the spring element acting on the pressure pot outside the pressure chamber and axially displace the pressure pot. The pressure pot can thereby press against a pressure plate and frictionally press a friction lining between the pressure plate, which is axially displaced by the pressure pot, and a counterplate fixed in the axial direction, to close the friction clutch and produce a torque flow via the friction clutch.

The friction clutch can be designed as a multi-disk clutch, in which outer disks connected to an outer disk carrier in a rotationally fixed but axially displaceable manner, in particular designed as friction linings or steel disks, and inner disks connected an inner disk carrier in a rotationally fixed but axially displaceable manner, in particular designed as steel disks or friction linings, are provided alternately one behind the other, which can be frictionally pressed between the counterplate and the pressure plate to bring about a torque flow between the outer disk carrier and the inner disk carrier. In traction mode, the torque generated in an internal combustion engine and/or an electrical machine can be introduced via the outer disk carrier and channeled out via the inner disk carrier, in particular to a transmission input shaft of a motor vehicle transmission, or vice versa.

When the pressure in the pressure chamber is reduced, the spring force of the spring element can move the pressure pot back into the axial starting position thereof, in particular the open position of the friction clutch, and the hydraulic fluid previously pumped into the pressure chamber can be displaced to an outlet. In principle, the clutch can also be actuated via piston release systems. A clutch arrangement has the basic function of producing a releasable, non-positive connection between a clutch input shaft and a clutch output shaft for the purpose of transmitting a torque.

The function of a multi-disk clutch is to establish a releasable, non-positive connection between a clutch input shaft and a clutch output shaft for the purpose of transmitting a torque.

The alternately arranged inner disks and outer disks of the disk set can be brought into non-positive contact by axially shifting and compressing the respective friction linings thereof through a coupling process, so that the inner disks and outer disks rotate synchronously around the common axis of rotation of the corresponding disk set.

On the other hand, if the inner disks and outer disks are axially pushed away from each other by a disengagement process, there is no longer any non-positive contact between the inner disks and the outer disks so that they can rotate freely against each other and consequently no torque is transmitted between the inner disks and the outer disks.

According to an example embodiment, it is provided that the at least one friction clutch has one or more wear debris reservoirs for receiving wear debris. Thus, wear debris can be collected in a reliable manner in the one or more wear debris reservoirs. In this way, it is possible to prevent the wear debris from getting into the region of the electrical machine and damaging same, for example.

The one or more wear debris reservoirs can be arranged axially between two or more outer disks, for example. Axial means along or parallel to the axis of rotation. It has been found that this is an advantageous arrangement for the receiving and securing of wear debris.

The one or more wear debris reservoirs may be arranged radially on the inside on an outer disk carrier of the friction clutch. It has been found that this is an advantageous arrangement for the receiving and securing of wear debris.

The one or more wear debris reservoirs may also be arranged, extending axially to the vehicle transmission side, on an outer disk carrier of the friction clutch. It has been found that this is an advantageous arrangement for the receiving and securing of wear debris.

The arrangements of the one or more wear debris reservoirs can be present in addition to one another or only in isolation.

According to an example embodiment, it is provided that the at least one friction clutch has one or more outer channels to lead away and/or secure wear debris from the at least one friction clutch. It has been found that wear debris that has previously collected at undesired locations can be led away through one or more outer channels and then secured without the functionality of the friction clutch or the hybrid module being adversely affected.

The one or more outer channels may penetrate an outer disk carrier of the friction clutch in an essentially radial manner. An essentially radial manner here means that the main extension axis of the outer channels is directed to be radial to the axis of rotation in such a way that wear debris can be led away or secured in the operating state of the friction clutch. Wear debris is therefore not kept blocked by centrifugal forces in a channel parallel to the axis of rotation.

A wear debris control system to protect the electrical machine from wear debris may also be arranged to be radial on the outside of the one or more outer channels, to be at least partially axial between the one or more outer channels and the electrical machine. This enables protection of the electrical machine and a safe or reliable leading away of wear debris after it has penetrated the one or more outer channels.

According to an example embodiment, it is provided that the wear debris control system is fixed to the transmission housing on the hybrid module, e.g., on an end shield of the hybrid module, and the end shield has one or more passages, which are arranged in such a way that in an operating state of the friction clutch, wear debris can be led away and/or secured through the one or more outer channels and then through the one or more passages. This enables a protection of the electrical machine and a safe or reliable leading away of wear debris after it has penetrated the one or more outer channels, for example.

According to an example embodiment, it is provided that the hybrid module has a rotationally fixed end shield, which has one or more wear debris reservoirs for receiving wear debris. This embodiment can, but does not need to be, combined with a wear debris control system and/or with one or more of the aforementioned outer channels. Such an arrangement of wear debris reservoirs reduces the risk that wear debris will collect elsewhere, for example on the electrical machine, and cause damage.

According to an example embodiment, it is provided that the at least one friction clutch has an inner disk carrier having one or more inner channels, and the one or more inner channels may penetrate the inner disk carrier in an essentially radial manner. It has been found that wear debris that has previously collected at undesired points radially on the inside of the inner disk carrier can be led away through one or more inner channels and then secured without the functionality of the friction clutch or the hybrid module being negatively affected.

According to an example embodiment, it is provided that the hybrid module has an axially acting paddle wheel geometry radially on the inside of the inner disk carrier. This increases the efficiency of leading away wear debris.

According to an example embodiment, it is provided that the hybrid module has a radially acting paddle wheel geometry radially on the inside of the inner disk carrier. This increases the efficiency of leading away wear debris.

According to an example embodiment, it is provided that the hybrid module has a hybrid module housing and may have at least one damper unit. At least the at least one electrical machine, the at least one friction clutch, e.g., designed as a multi-disk clutch, and the at least one damper unit, for example, are arranged in the hybrid module housing. The at least one damper unit may be arranged within the drive train between an internal combustion engine connection and the friction clutch. This enables a smoothly running hybrid module, the functionality of which is not reduced by wear debris.

The internal combustion engine connection of the hybrid module has the function of introducing the torque emanating from the internal combustion engine into the hybrid module following in the drive train. The internal combustion engine connection of the hybrid module can be designed, for example, as a shaft, hollow shaft, flange, or hub.

According to an example embodiment, it is provided that the drive body is rotationally fixed at the end thereof facing the engine side to a damper unit for a damping of rotational irregularities of the internal combustion engine, and the damper unit can be rotationally fixed to an input shaft of the internal combustion engine. The damper unit can be attached to the input shaft of the internal combustion engine, which is designed as a crankshaft. The damper unit can be a dual mass flywheel, for example. Technically, this means that the primary mass and the secondary mass, which is coupled to the primary mass in a limitedly rotatable manner via the energy storage element, in particular designed as an arc spring, can form a mass-spring system which, within a certain frequency range, can dampen rotational irregularities in the speed and in the torque of the drive power generated by a motor vehicle engine.

The mass moment of inertia of the primary mass and/or the secondary mass and the spring characteristic of the energy storage element can be selected in such a way that vibrations in the frequency range of the dominant engine orders of the motor vehicle engine can be dampened. The mass moment of inertia of the primary mass and/or the secondary mass can in particular be influenced by an attached additional mass. The primary mass can have a disk to which a cover can be connected, as a result of which an essentially annular receiving space for the energy storage element can be delimited. The primary mass can, for example, tangentially strike the energy storage element via impressions protruding into the receiving space. An output flange of the secondary mass, which can tangentially strike the opposite end of the energy storage element, can protrude into the receiving space.

If the torsional vibration damper is part of a dual mass flywheel, the primary mass can have a flywheel that can be coupled to a drive shaft of a motor vehicle engine. If the torsional vibration damper as a pulley decoupler is part of a pulley arrangement for driving ancillary units of a motor vehicle with the aid of a traction device, the primary mass can form a pulley on the radially outer surface of which the traction device, in particular a V-belt, can act to transmit torque. If the torsional vibration damper is used as a disk damper, in particular a clutch disk of a friction clutch, the primary mass can be coupled to a disk region bearing friction linings, while the secondary mass can be coupled to a transmission input shaft of a motor vehicle transmission.

In other words, damper units have the task of dampening vibrations between the engine and the transmission. Internal combustion engines in particular do not output a constant torque. The constantly changing angular speeds of the crankshaft generate vibrations that can be transmitted to the vehicle transmission via the clutch system and the transmission input shaft. Here, these vibrations can cause undesired rattling noises. Torsional vibration dampers are designed to reduce these vibrations between the engine and the transmission.

The use of a centrifugal pendulum with at least one pendulum mass may also be provided for the clutch arrangement. Under the influence of centrifugal force, the at least one pendulum mass of the centrifugal pendulum strives to assume a position as far away as possible from the center of rotation. The "zero position" is the position radially furthest from the center of rotation, which the pendulum mass can assume in the radially outer position. With a constant drive speed and constant drive torque, the pendulum mass will assume this radially outer position. In the event of speed fluctuations, the pendulum mass deflects due to the inertia thereof along the pendulum path thereof. The pendulum mass can thereby be shifted in the direction of the center of rotation.

The centrifugal force acting on the pendulum mass is divided into a component tangential and a further component normal to the pendulum path. The tangential force component provides the restoring force that seeks to bring the pendulum mass back into the "zero position" thereof, while the normal force component acts on a force introduction element that initiates the speed fluctuations, in particular a flywheel connected to the drive shaft of the motor vehicle engine, and generates a counter-torque there that counteracts the speed fluctuation and dampens the speed fluctuations introduced.

In the case of particularly strong fluctuations in speed, the pendulum mass can therefore have swung out to the maximum and assume the position that is furthest in the radial direction. The tracks provided in the carrier flange and/or in the pendulum mass have suitable curvatures for this purpose, in which a coupling element, in particular designed as a roller, can be guided. At least two rollers may be provided, each of which is guided on a track of the carrier flange and a pendulum track of the pendulum mass. In particular, more than one pendulum mass is provided. A plurality of pendulum masses may be guided on the carrier flange in a uniformly distributed manner in the circumferential direction.

The inertial mass of the pendulum mass and/or the relative movement of the pendulum mass to the carrier flange is designed in particular to dampen a certain frequency range of rotational irregularities, in particular an engine order of the motor vehicle engine. In particular, more than one pendulum mass and/or more than one carrier flange is provided. For example, two pendulum masses connected to one another via bolts or rivets designed in particular as spacer bolts are provided, between which the carrier flange is positioned in the axial direction of the torsional vibration damper. Alternatively, two flange parts of the carrier flange, in particular connected to one another in a substantially Y-shape, can be provided, between which the pendulum mass is positioned.

According to an example embodiment, it is provided that the friction clutch is designed as a multi-disk clutch with outer disks and with inner disks. One or more outer disks are designed as steel disks and/or one or more inner disks are designed as lining disks. Wear debris caused by this disk arrangement can be reliably led away or secured.

According to an example embodiment, it is provided that the friction clutch is designed as a multi-disk clutch with outer disks and with inner disks. One or more inner disks are designed as steel disks and/or one or more outer disks are designed as lining disks. Wear debris caused by this disk arrangement can be reliably led away or secured.

The present disclosure further relates to a friction clutch, in particular a multi-disk clutch, for a hybrid module, in particular for a drive train of a motor vehicle. The hybrid module can be arranged as a P2 hybrid module within the drive train between an internal combustion engine side of the motor vehicle, directed toward an internal combustion engine, and a vehicle transmission side of the motor vehicle, directed toward a vehicle transmission, with the features of the hybrid module according to at least one of the preceding features, including the features of the multi-disk clutch according to at least one of the preceding features.

BRIEF DESCRIPTION OF THE DRAWINGS

In the following, the disclosure is explained by way of example with reference to the accompanying drawings using exemplary embodiments. The features shown below can represent an aspect of the disclosure both individually and in combination. In the figures.

DETAILED DESCRIPTION

Figure 1:
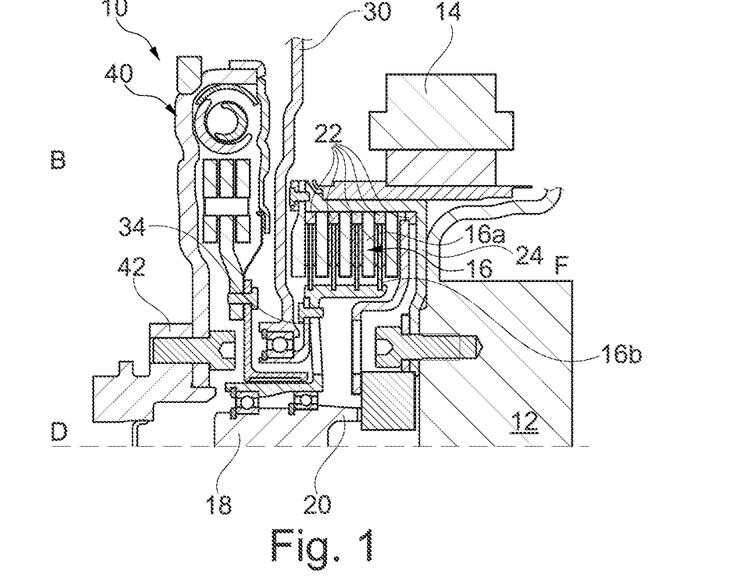
FIG. 1 shows a first embodiment of a hybrid module according to the disclosure.

FIG. 1 shows an exemplary embodiment of a dry friction clutch 16 according to the disclosure. The dry friction clutch 16 is designed as a dry multi-disk clutch and includes, among other things, a plurality of outer disks 16a, which are designed as steel disks, for example, and a corresponding plurality of inner disks 16b, which are designed, for example, as lining disks. The multi-disk clutch has an axial axis, corresponding to an axis of rotation D of the friction clutch 16, and a radial axis which extends transversely to the axis of rotation D. The outer disks 16a are suspended on the outside in the radial direction and are displaceable in the axial direction. The inner disks 16b are suspended on the inside in the radial direction and are displaceable in the axial direction. By shifting the inner disks 16b and the outer disks 16a relative to each other in the axial direction, inner disks 16b and outer disks 16a adjacent in the axial direction can be brought into frictional engagement with one another, so that torque can be transmitted from the inner disks 16b to the outer disks 16a and vice versa.

The multi-disk clutch also has a driving ring as an inner disk carrier 34, on which the inner disks 16b are suspended in a torque-transmitting manner. The outer disks 16a are suspended from a rotor pot as an outer disk carrier 24. In operation, in the engaged state of the multi-disk clutch, torque can be transmitted between the driving ring via the inner disks 16b and the outer disks 16a to the rotor pot and vice versa, depending on whether a pulling operation or pushing operation is present.

The arrangement of steel and lining disks can in principle take place in both directions, inside and outside. In principle, a separate toothing ring can also be attached to both types of disks. Here, as an example, only an embodiment of an inside friction disk having a toothing ring in combination with an outside steel disk without an additional toothing ring is disclosed.

The torque introduced by the rotor via the outer disk carrier 24 is introduced into the steel disk via an annular carrier plate. This carrier plate has a toothing on the outer diameter, which is in contact with the outer disk carrier 24. Furthermore, the carrier plate contains spring elements that enable an axial path between the steel disk and the outer disk carrier. Since the rigidity of the outer leaf spring elements is to be kept as low as possible, there is no longer any relative movement/sliding friction in the toothing even at a low torque.

The lining disk transfers the torque from the steel disk to the inner disk carrier 34. This also takes place between the friction lining and the inner disk carrier via an annular carrier plate. Depending on the surface pressure, the toothing can either be integrated directly into the carrier plate or, in the case of high coupling torques, into an additional toothing ring. This is then riveted to the carrier plate. The inner carrier plate also contains spring elements which enable an axial path between the lining disk and the inner disk carrier 34. The functional principle is the same on the outside.

The friction clutch 16 is provided in particular for a hybrid module 10. The basic idea of the hybrid module 10 is the wear debris management from the friction clutch 16. A hybrid module 10 is therefore basically provided, in particular for a drive train of a motor vehicle, which hybrid module 10 can be arranged as a P2 hybrid module within the drive train between an internal combustion engine side B of the motor vehicle, directed toward an internal combustion engine, and a vehicle transmission side F of the motor vehicle, directed toward a vehicle transmission 12. The hybrid module has at least one electrical machine 14; at least one dry friction clutch 16 with an axis of rotation D, the friction clutch 16 having a dry multi-disk clutch, for example; an input shaft 18, which can be coupled to the internal combustion engine of the motor vehicle; and an output shaft 20, which can be coupled to the vehicle transmission 12 of the motor vehicle. The at least one electrical machine 14 and the at least one friction clutch 16 cooperate in such a way that the electrical machine 14 can be coupled into and/or uncoupled from the drive train of the motor vehicle by means of the friction clutch 16 and the at least one friction clutch 16 is designed to lead away and/or secure wear debris of the at least one friction clutch 16.

The leading away or the securing of wear debris present in the dry friction clutch 16 can, as shown in FIGS. 1 to 7, take place in different ways. The exemplary embodiments in FIGS. 1 to 7 are exemplary embodiments that are independent of one another. Purely by way of example and not by way of limitation, the friction clutch 16 is shown in all embodiments as a multi-disk clutch and the electrical machine 14 as an electric motor.

In the exemplary embodiment shown in FIG. 1, the wear debris produced is held within the immediate clutch region, in the present example in the form of a multi-disk clutch, namely in wear debris reservoirs 22, as the reservoir region. Under centrifugal force, the wear debris is deposited in the best possible radial position, which is encapsulated outward, within the clutch region, and remains there. The lateral boundaries, or axial boundaries, of the coupling region protrude sufficiently far inward in the radial direction to prevent the wear debris from escaping laterally. Sufficient free regions outside of the immediate functional regions, for example the leaf spring working region, are present within the clutch region to store the entire wear debris that occurs over the service life without disruption, namely in the reservoir region. In particular, according to FIG. 1 it is thus provided that the at least one friction clutch 16 has one or more wear debris reservoirs 22 for receiving wear debris, between a plurality of outer disks 16a, and the plurality of wear debris reservoirs 22 are arranged radially inward on an outer disk carrier 24 of the friction clutch 16.

Figure 2:
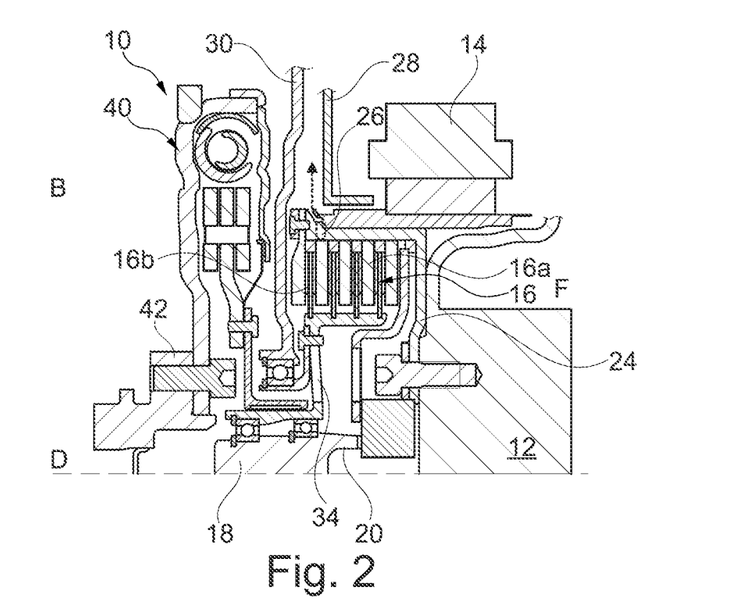
FIG. 2 shows a second embodiment of a hybrid module according to the disclosure.

In the exemplary embodiment shown in FIG. 2, different from or in addition to FIG. 1, the radially outer delimitation of the immediate coupling region is not completely encapsulated, but is provided with outer channels 26 leading radially outward. Furthermore, between the region radially outside of the described outer channels 26 and that of the electrical machine 14, designed as an electric motor, there is a wear debris control system 28, designed as a baffle plate, to protect the electric motor from wear debris. This can be fixed to the gearbox or designed to rotate with the rotor of the electric motor. The wear debris leaves the immediate clutch region radially outward under centrifugal force and remains on the left, with reference to FIG. 2, i.e., on the side of the baffle plate facing away from the transmission. The side facing away from the transmission is the internal combustion engine side B. In particular, according to FIG. 2, it is thus provided that the friction clutch 16 has one or more outer channels 26 to lead away and/or secure wear debris of the friction clutch 16. The one or more outer channels 26 may penetrate an outer disk carrier 24 of the friction clutch 16 in an essentially radial manner. In this case, a wear debris control system 28 to protect the electrical machine 14 from wear debris may be arranged radially on the outside of the one or more outer channels 26, at least partially axially between the one or more outer channels 26 and the electrical machine 14.

Figure 3:
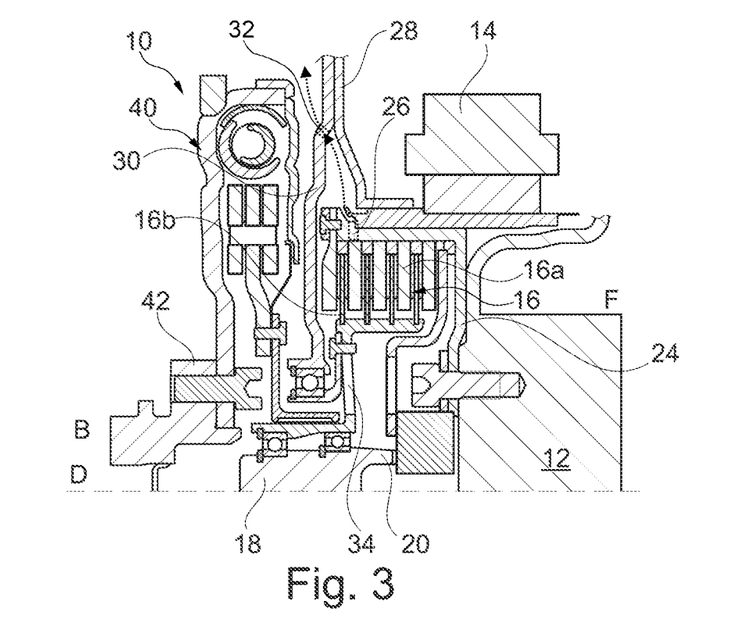
FIG. 3 shows a third embodiment of a hybrid module according to the disclosure.

In the exemplary embodiment shown in FIG. 3, different from or in addition to FIG. 2, a wear debris control system 28, formed as a baffle plate fixed to the transmission housing, is designed in such a way that the wear debris is directed under the influence of the centrifugal force acting thereon in the direction of passages 32 in a bearing support, or end shield, 30 formed as a partition wall. The wear debris passes through the passages 32 into the radially outer region on the side of the partition wall facing away from the transmission and remains there. In particular, according to FIG. 3, it is thus provided that the friction clutch 16 has one or more outer channels 26 to lead away and/or secure wear debris of the at least one friction clutch 16, and the one or more outer channels 26 may penetrate an outer disk carrier 24 of the friction clutch 16 substantially radially.

A wear debris control system 28 to protect the electrical machine 14 from wear debris may be arranged radially on the outside of the one or more outer channels 26, at least partially axially between the one or more outer channels 26 and the electrical machine 14. Furthermore, it is provided according to FIG. 3 that the wear debris control system 28 is arranged to be fixed to the transmission housing on the hybrid module 10, e.g., on an end shield 30 of the hybrid module 10, and the end shield 30 has one or more passages 32 which are arranged in such a way that in an operating state of the friction clutch 16, wear debris can be led away and/or secured through the one or more outer channels 26 and then through the one or more passages 32.

Figure 4:
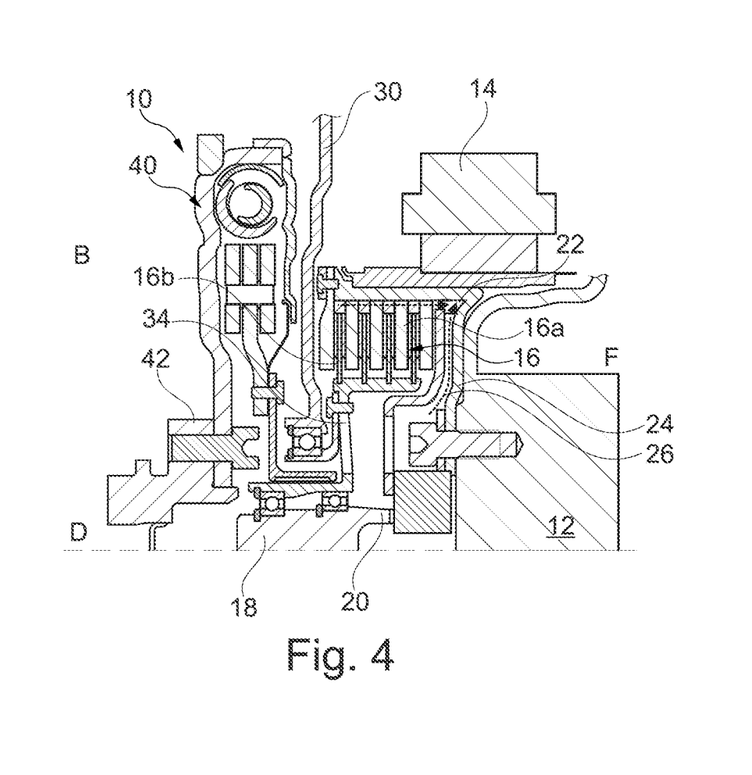
FIG. 4 shows a fourth embodiment of a hybrid module according to the disclosure.

In the exemplary embodiment shown in FIG. 4, different from or in addition to FIG. 1, regions within the laterally and radially outwardly encapsulated coupling region are designed as a reservoir in such a way that the wear debris collects there. This collecting process may be supported by the leakage from the, in particular hydraulic, actuation system that collects there at the same time under centrifugal force. In particular, according to FIG. 4 it is thus provided that the at least one friction clutch 16 has one or more wear debris reservoirs 22 for receiving wear debris, between a plurality of outer disks 16a, and the plurality of wear debris reservoirs 22 are arranged radially inward on an outer disk carrier 24 of the friction clutch 16. The one or more wear debris reservoirs 22 are arranged, extending axially to the vehicle transmission side F, on an outer disk carrier 24 of the friction clutch 16. It is shown that the outer disk carrier 24 can be designed differently for this purpose than in FIG. 1 to form a larger reservoir.

Figure 5:
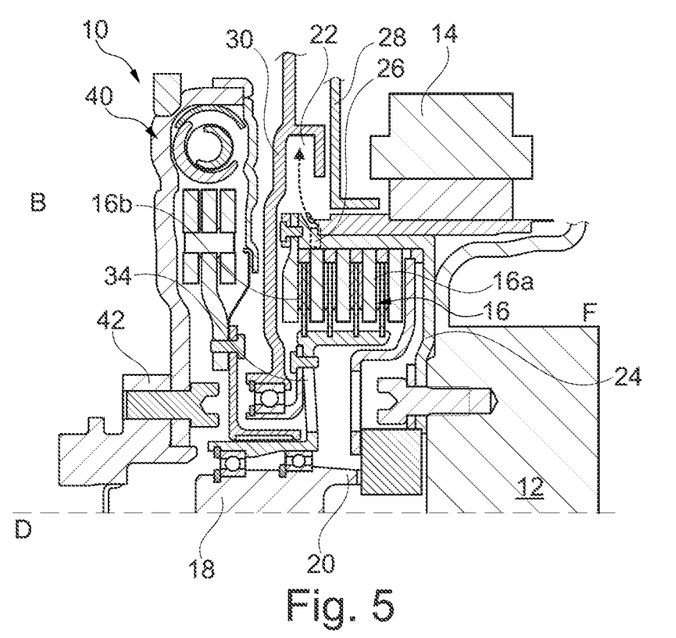
FIG. 5 shows a fifth embodiment of a hybrid module according to the disclosure.

In the exemplary embodiment shown in FIG. 5, different from or in addition to FIG. 2, the partition wall is provided with regions that are trap-shaped, that is to say laterally and radially outwardly sufficiently closed, in which the wear debris can collect permanently. In particular, according to FIG. 5, it is thus provided that the friction clutch 16 has one or more outer channels 26 to lead away and/or secure wear debris of the at least one friction clutch 16. The one or more outer channels 26 may penetrate an outer disk carrier 24 of the friction clutch 16 in an essentially radial manner. Optionally, a wear debris control system 28 to protect the electrical machine 14 from wear debris is optionally arranged radially on the outside of the one or more outer channels 26, at least partially axially between the one or more outer channels 26 and the electrical machine 14. The hybrid module 10 may have a rotationally fixed end shield 30 which has one or more wear debris reservoirs 22 for receiving wear debris.

Figure 6:
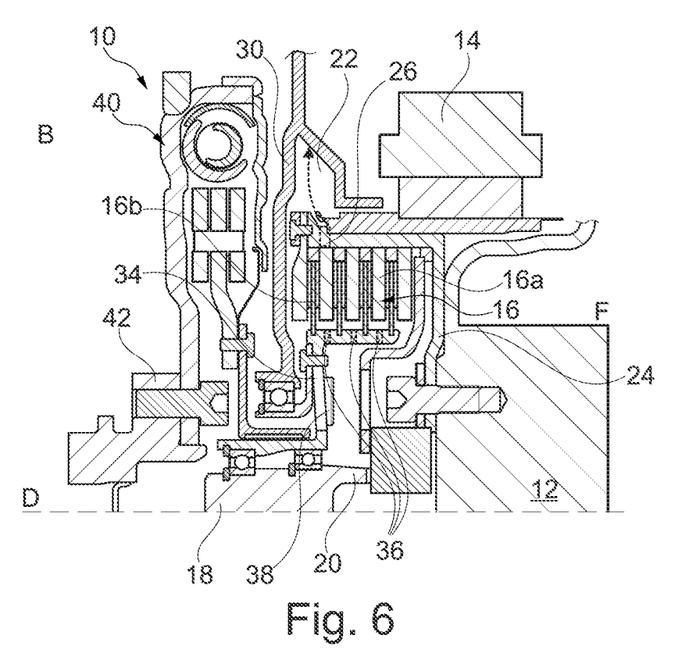
FIG. 6 shows a sixth embodiment of a hybrid module according to the disclosure.

In the exemplary embodiment shown in FIG. 6, different from or in addition to FIG. 5, the radially outward conveying of the wear debris under centrifugal force is supported by internal, axially acting paddle wheel geometries 38, here in the inner disk carrier 34. For this purpose, in an example arrangement, the inner disk carrier 34 is provided with inner channels 36 in the predominantly cylindrical region. In particular, it is thus provided according to FIG. 6, that the friction clutch 16 has one or more outer channels 26 to lead away and/or secure wear debris of the friction clutch 16, and the one or more outer channels 26 may penetrate an outer disk carrier 24 of the friction clutch 16 in an essentially radial manner. It is provided that the hybrid module 10 has a rotationally fixed end shield 30, which has one or more wear debris reservoirs 22 for receiving wear debris.

It is optionally provided that the at least one friction clutch 16 has an inner disk carrier 34 with one or more inner channels 36, and the one or more inner channels 36 may penetrate the inner disk carrier 34 in an essentially radial manner. It is also optionally provided that the hybrid module 10 has an axially acting paddle wheel geometry 38 radially on the inside of the inner disk carrier 34.

Figure 7:
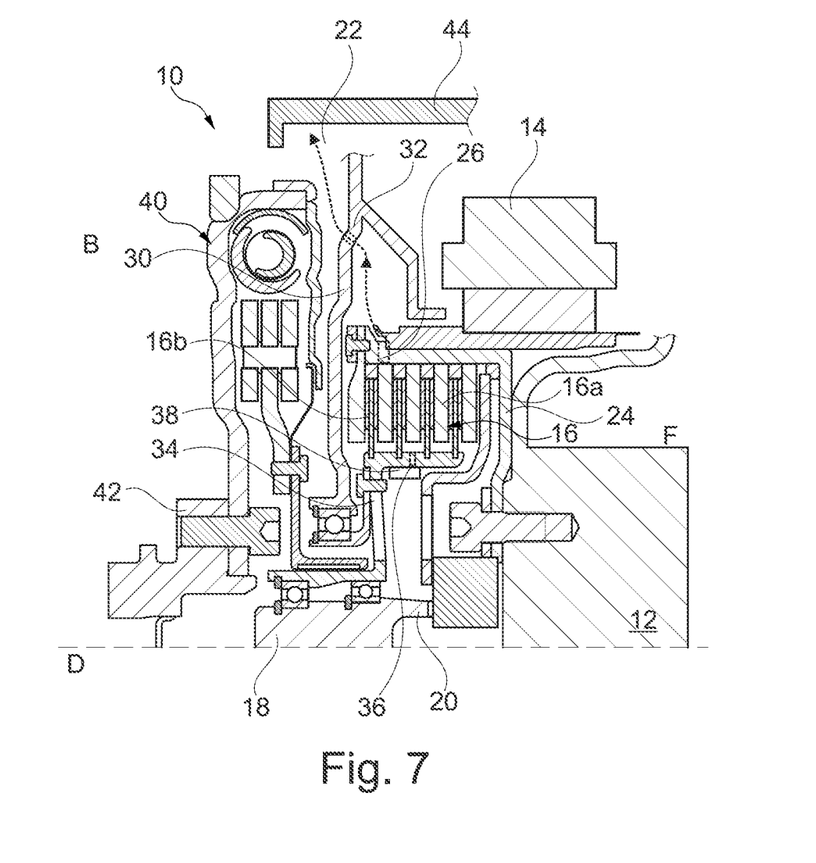
FIG. 7 shows a seventh embodiment of a hybrid module according to the disclosure.

In the exemplary embodiment shown in FIG. 7, different from or in addition to FIG. 6, the centrifugal force radially outward conveying of the wear debris is supported by internal, radially acting paddle wheel geometries, in the present case in the internal cylindrical region of the inner disk carrier. In particular, it is thus provided according to FIG. 7, that the friction clutch 16 has one or more outer channels 26 to lead away and/or secure wear debris of the friction clutch 16, and the one or more outer channels 26 may penetrate an outer disk carrier 24 of the friction clutch 16 in an essentially radial manner. It is provided that the hybrid module 10 has a rotationally fixed end shield 30, which has one or more wear debris reservoirs 22 for receiving wear debris.

It is optionally provided that the at least one friction clutch 16 has an inner disk carrier 34 with one or more inner channels 36, and the one or more inner channels 36 may penetrate the inner disk carrier 34 in an essentially radial manner. It is also optionally provided that the hybrid module 10 has a radially acting paddle wheel geometry 38 radially on the inside of the inner disk carrier 34.

Also shown in FIG. 7 is a radially outer clutch bell housing 44. This clutch bell housing 44 can be part of the end shield 30 or can be arranged in some other way on the hybrid module 10. The clutch bell housing 44 is not limited to the embodiment of FIG. 7, but forms a separate feature. Thus, the clutch bell housing 44 can also be used in other embodiments, for example according to FIGS. 1 to 6. The clutch bell housing 44 may form a wear debris reservoir 22.

In principle, it is possible in all exemplary embodiments that the hybrid module 10 has a hybrid module housing and at least one damper unit 40, for example. At least the at least one electrical machine 14, the at least one friction clutch 16, e.g., as a multi-disk clutch, and the at least one damper unit 40, for example, are arranged in the hybrid module housing. The at least one damper unit 40 may be arranged within the drive train between an internal combustion engine connection 42 and the friction clutch 16.

The disclosed device is intended for use with dry friction clutches 16 or disconnect clutches, especially K0 modules in P2 arrangements. The strategies shown can, however, be transferred directly to other applications, e.g., with hybridized drive trains. Particular mention should be made of triple clutches and K1 modules for dedicated hybrid transmissions.

In a hybrid drive train, in particular of a motor vehicle, an internal combustion engine is connected via a crankshaft to the friction clutch 16 designed as a multi-disk clutch, which is designed as a K0 or disconnect clutch for disconnecting and connecting the internal combustion engine from the hybrid drive train. The multi-disk clutch is designed concentrically with an electrical machine 14. Torque can be transmitted to the wheels of the motor vehicle via an output shaft 20. The output shaft 20 can thus be connected to the multi-disk clutch and the electrical machine 14. The multi-disk clutch is integrated, in particular, into a rotor of the electrical machine 14. The electrical machine 14 may be an electric motor and/or an electric generator.

REFERENCE NUMERALS

10 Hybrid module
12 Vehicle transmission
14 Electrical machine
16 Friction clutch
16a Outer disks
16b Inner disks
18 Input shaft
20 Output shaft
22 Wear debris reservoir
24 Outer disk carrier
26 Outer channel
28 Wear debris control system
30 End shield
32 Passage
34 Inner disk carrier
36 Inner channel
38 Paddle wheel geometry
40 Damper unit
42 Internal combustion engine connection
44 Clutch bell housing
B Internal combustion engine side
F Vehicle transmission side
D Axis of rotation

The invention claimed is:

1. A hybrid module for a drive train of a motor vehicle comprising:
    an electrical machine;
    a dry friction clutch for coupling the electrical machine with the drive train, the dry friction clutch designed to lead away or secure wear debris of the dry friction clutch and comprising:
        an axis of rotation; and
        an outer disk carrier; and
        an outer channel penetrating the outer disk carrier substantially radially to lead away or secure the wear debris;
    an input shaft arranged to be coupled to an internal combustion engine of the motor vehicle;
    an output shaft arranged to be coupled to a vehicle transmission of the motor vehicle;
    a module housing comprising an end shield; and
    a wear debris control system fixed to the end shield to protect the electrical machine from the wear debris, wherein the end shield comprises a passage arranged such that, in an operating state of the dry friction clutch, the wear debris can be led away or secured through the outer channel and then through the passage.

2. The hybrid module of claim 1 wherein the hybrid module is arranged within the drive train between:
    an internal combustion engine side of the motor vehicle, directed towards the internal combustion engine; and
    a vehicle transmission side of the motor vehicle, directed towards the vehicle transmission.

3. The hybrid module of claim 1 wherein the dry friction clutch is a dry multi-disk clutch.

4. The hybrid module of claim 1 wherein the dry friction clutch comprises a wear debris reservoir for receiving wear debris.

5. The hybrid module of claim 4 wherein:
the dry friction clutch comprises a plurality of outer disks; and
the wear debris reservoir is disposed between two of the plurality of outer disks.

6. The hybrid module of claim 4 wherein:
the dry friction clutch comprises an outer disk carrier; and
the wear debris reservoir is arranged radially inward on the outer disk carrier.

7. The hybrid module of claim 4 wherein:
the dry friction clutch comprises an outer disk carrier; and
the wear debris reservoir is arranged to extend axially to a vehicle transmission side, directed towards the vehicle transmission, on the outer disk carrier.

8. The hybrid module of claim 1 wherein the wear debris control system is arranged radially on an outside of the outer channel at least partially axially between the outer channel and the electrical machine.

9. The hybrid module of claim 1 wherein:
the end shield comprises a wear debris reservoir for receiving the wear debris.

10. The hybrid module of claim 1 wherein the dry friction clutch comprises an inner disk carrier with an inner channel.

11. The hybrid module of claim 10 wherein the inner channel penetrates the inner disk carrier in an essentially radial manner.

12. The hybrid module of claim 1, wherein the electrical machine and the dry friction clutch are arranged in the module housing.

13. The hybrid module of claim 12 further comprising a damper unit arranged in the module housing.

14. The hybrid module of claim 13 wherein the damper unit is arranged within the drive train between an internal combustion engine connection and the dry friction clutch.

\* \* \* \* \*